(12) United States Patent
Park

(10) Patent No.: US 7,044,596 B2
(45) Date of Patent: May 16, 2006

(54) HINGELESS EYEGLASSES FRAME

(76) Inventor: Andrew Q. Park, 680 Fargo Ave., Elk Grove Village, IL (US) 60007

( * ) Notice: Subject to any disclaimer, the term of this patent is extended or adjusted under 35 U.S.C. 154(b) by 0 days.

(21) Appl. No.: 10/883,271

(22) Filed: Jul. 1, 2004

(65) Prior Publication Data

US 2005/0168684 A1 Aug. 4, 2005

Related U.S. Application Data

(63) Continuation-in-part of application No. 29/198,666, filed on Feb. 2, 2004.

(51) Int. Cl.
*G02C 1/04* (2006.01)
(52) U.S. Cl. .................. 351/103; 351/153; 16/228
(58) Field of Classification Search ............ 351/153, 351/124, 111, 110, 41, 103; 16/228
See application file for complete search history.

(56) References Cited

U.S. PATENT DOCUMENTS

| | | | |
|---|---|---|---|
| 3,756,704 A | 9/1973 | Marks | |
| 4,720,186 A | 1/1988 | Douillard | |
| 5,367,344 A | 11/1994 | Fuchs | |
| 5,471,257 A | 11/1995 | Houmand | |
| 5,640,217 A * | 6/1997 | Hautcoeur et al. | ............ 351/41 |
| 5,745,210 A | 4/1998 | Biernat, Jr. et al. | |
| 6,089,709 A | 7/2000 | Fairclough | |
| 6,139,143 A | 10/2000 | Brune et al. | |
| 6,290,355 B1 | 9/2001 | Chen | |
| 6,296,355 B1 | 10/2001 | Rittmann | |
| 6,334,679 B1 | 1/2002 | Masunaga et al. | |
| 6,375,324 B1 | 4/2002 | Schleger et al. | |
| 6,644,805 B1 | 11/2003 | Nakamura | |
| 2002/0051115 A1 | 5/2002 | Yoshimura et al. | |
| 2002/0140898 A1 | 10/2002 | Wu | |
| 2003/0071962 A1 | 4/2003 | Nishihara | |

FOREIGN PATENT DOCUMENTS

JP 57082816 A 5/1982

* cited by examiner

*Primary Examiner*—Hung Xuan Dang
(74) *Attorney, Agent, or Firm*—Welsh & Katz, Ltd.

(57) ABSTRACT

A frame for a pair of eyeglasses includes an all-metal body having a central bridge portion, lens attachment segments disposed opposite the bridge portion, and first and second temple sections extending rearwardly from ends of the lens attachment segments. The temple sections are soldered or welded to the ends of the lens attachment segments. The frame further includes nose pads operatively coupled to the bridge portion, and distal ends of the temple sections, each having a metal tip formed in a bulbous or teardrop shape.

26 Claims, 4 Drawing Sheets

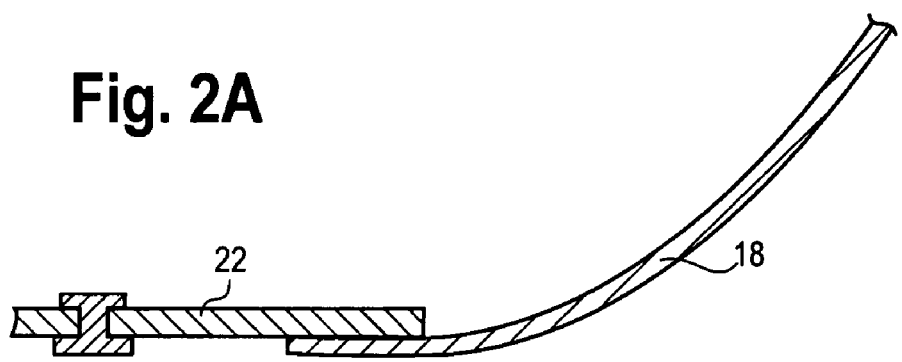
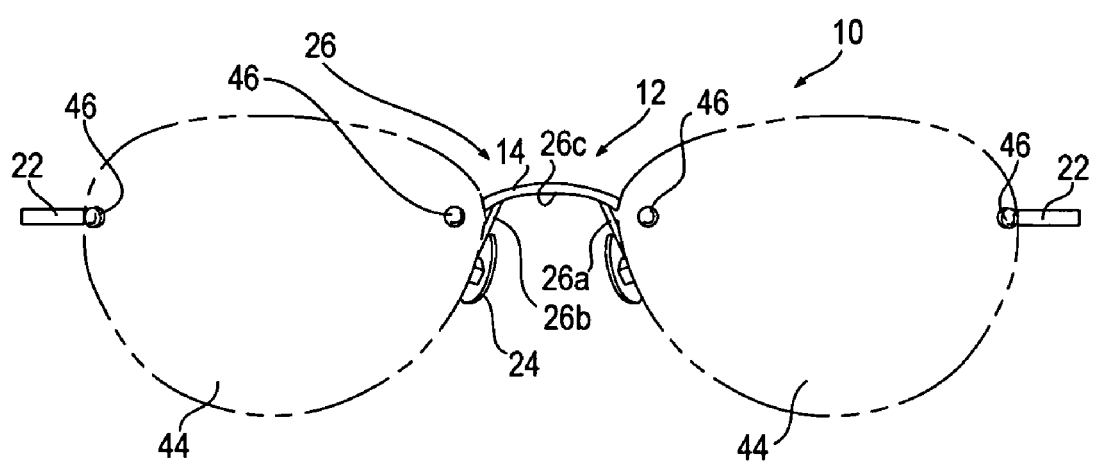
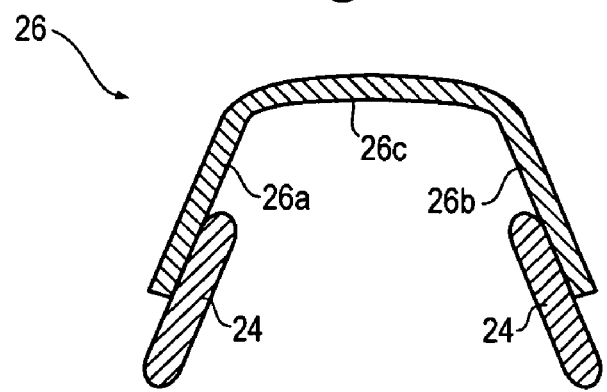

HINGELESS EYEGLASSES FRAME

CROSS-REFERENCE TO RELATED APPLICATION

This application is a continuation-in-part of application Ser. No. 29/198,666, filed Feb. 2, 2004, entitled EYEGLASSES.

BACKGROUND OF THE INVENTION

The present invention is directed to a frame for a pair of eyeglasses. More particularly, the present invention pertains to a pair of eyeglasses having a hingeless, all-metal frame.

The prior art discloses many different types of eyeglasses and frames. Conventional frames include a pair of rims each holding a lens, a bridge for connecting the rims, and a pair of temples or ear stems connected directly or indirectly to the rims via a pivoting hinge. The pivoting hinge generally incorporates two interlocking pieces, one piece of the hinge attached to the rim and the other piece attached to the temple or ear stem. A conventional fastener, such as a screw, connects the two interlocking pieces.

While many improvements to the hinges or hinge assembly mechanisms have been made, these hinges still substantially rely on tension created by the fastener to maintain the integrity of the connection. Hinge fasteners become loose during normal wear, and are prone to mechanical failure, resulting in undesired movement of the frame on a wearer's head, or total frame failure. In order to maintain a comfortable and secure frame fit, the fasteners may require professional adjustment.

Known attempts to overcome the loosening of the hinge include thread-locking adhesives and mechanical fastener-end deformation (peening). These solutions, however, are unsatisfactory because of the additional manufacturing steps and costs required. In addition, fastener-securing methods render frame re-adjustment difficult or impossible.

Other prior art frames provide a one-piece or unitary frame. An example of such a frame may be disclosed in U.S. Pat. No. 5,367,344, issued to Fuchs (the '344 patent). The '344 patent is directed to an eyeglasses frame made of spring wire, which provides "leaf spring-like flat portions" rather than pivoting hinges. Although the '344 patent eliminates the conventional hinge, such designs suffer from decreased strength and structural integrity. True unitary frames which are made from a single piece of metal are much more susceptible to snapping, twisting, or deformation. They are also more costly to manufacture because the gauge and/or cross-sectional shape of the metal forming the front part of the frame is typically different in gauge and/or cross-sectional shape than the ear stem portions. This makes manufacturing expensive and complex.

Other conventional frames are made of plastic or a combination of plastic and metal. Even frames made predominantly of metal include some plastic components, such as the nose pads. Additionally, frames made of plastic are easily broken.

Accordingly, there exists a need for an all-metal, hingeless eyeglasses frame having separately attached temple portions. Such a frame combines the sturdiness and strength of an all-metal composition. Such a frame construction also provides consumers with a better value because it is less likely to break than conventional hinged or true unitary frames, and does not require inconvenient readjustment procedures.

BRIEF SUMMARY OF THE INVENTION

A frame for a pair of eyeglasses includes an all-metal body having a central bridge portion, nose pads operatively coupled to the bridge portion, lens attachment segments disposed opposite the bridge portion, where each lens attachment segment has an attachment tab. Also included are left and right temple sections extending rearwardly from each corresponding attachment tab. The temple sections are soldered, brazed or welded to the attachment tab. The distal ends of the temple sections each terminate in a metallic tip, which may be bulbous or teardrop in shape.

Preferably, the nose pads may be soldered or welded to the bridge portion. Each nose pad also may be soldered or welded to one of a pair of legs, which in turn depend from the bridge portion, and are soldered or welded thereto. At least a portion of the temple sections may be coated with a thin covering, such as plastic, acrylic, or polyurethane. The frame preferably is made of stainless, steel, aluminum, titanium, nickel silver, copper, brass, or alloys thereof.

In one embodiment, the temple sections may be soldered or welded to the ends of the lens attachment segments or "attachment tabs" such that a hingeless connection is established. The body, lens attachment segments, temple sections, nose pads, and temple tips preferably provide an uninterrupted electrical conductor formed of metal.

Known lenses operatively coupled to the lens attachment segments transform the frames into a pair of eyeglasses. Preferably, the lenses and lens attachment segments include apertures for receiving fasteners.

Further objects, features, and advantages of the present invention, together with the organization and manner of use thereof, will become apparent from the following description of the invention when taken in conjunction with the accompanying drawings, wherein like reference numerals designate like elements throughout the several views.

While the present invention is susceptible to various modifications and alternative forms, specific embodiments thereof are shown by way of example in the accompanying drawings and will be described in detail. It should be understood that the drawings and detailed description thereof are not intended to limit the invention to the particular form disclosed, but rather the invention is intended to cover all modifications, equivalents, and alternatives falling within the spirit and scope of the present invention.

BRIEF DESCRIPTION OF THE DRAWINGS

FIG. 2A is an enlarged view of the attachment between the temple section and the attachment tab;

FIG. 3 is a front elevational view of the hingeless eyeglass frame of FIG. 1;

FIG. 3A is an enlarged view of the leg portion and nose pad shown apart from the frame;

DETAILED DESCRIPTION OF THE INVENTION

Figure 1:
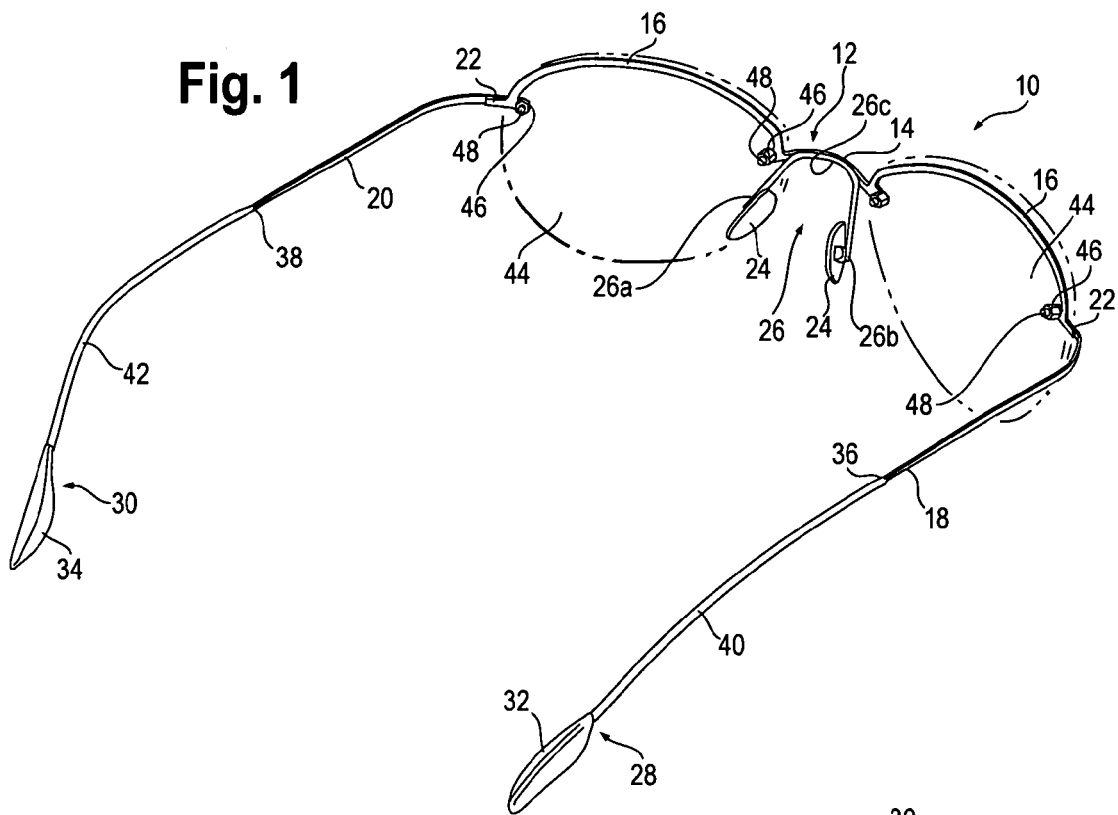
FIG. 1 is a perspective view of a hingeless eyeglass frame in accordance with a specific embodiment of the present invention, depicting the frame in an open, or unfolded state.
Figure 2:
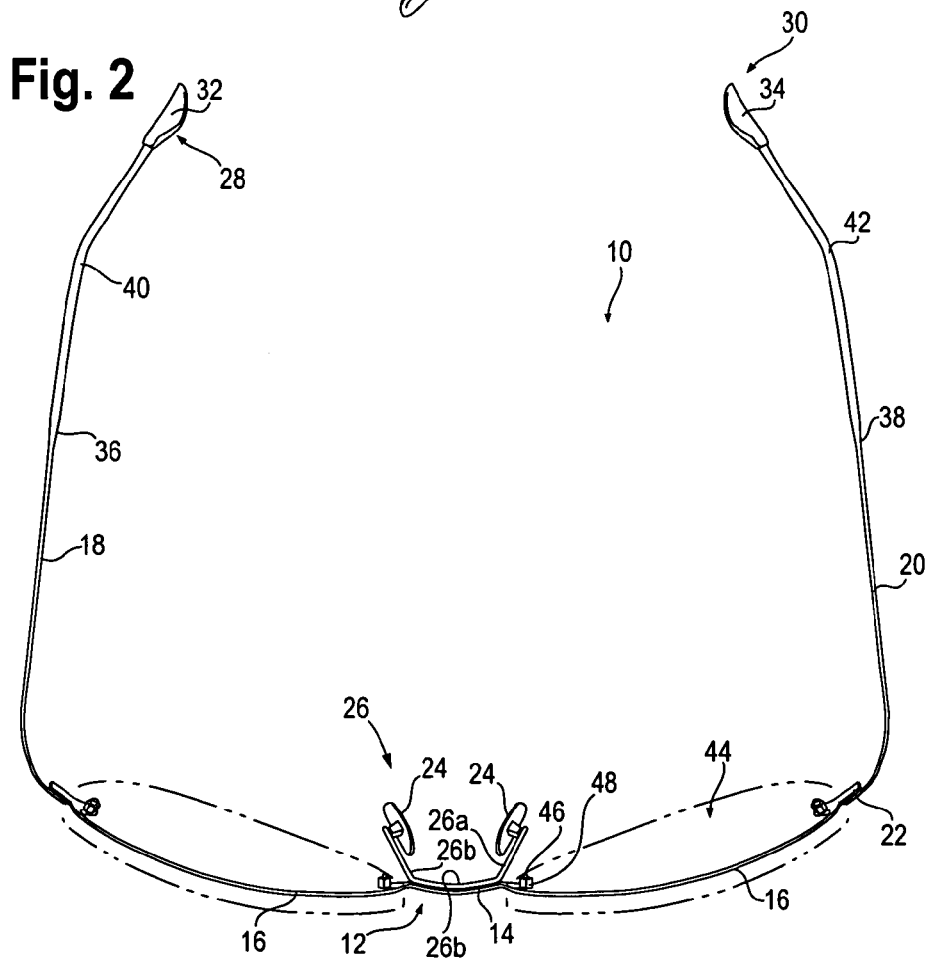
FIG. 2 is a top plan view of the hingeless eyeglass frame of FIG. 1.
Figure 4:
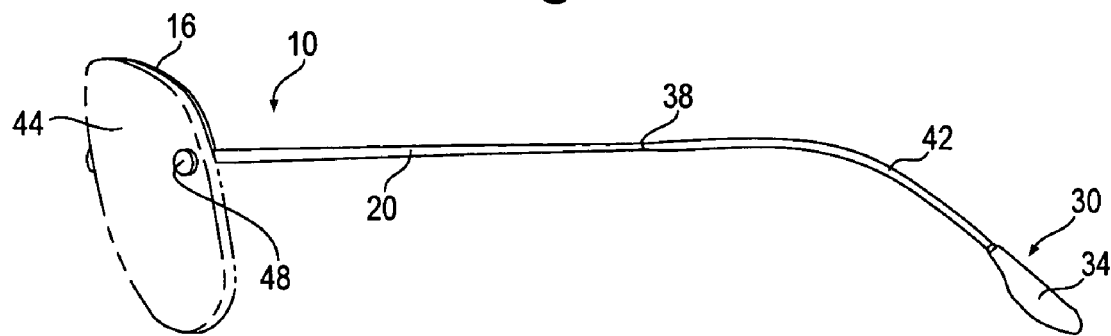
FIG. 4 is a side elevational view of the hingeless eyeglass frame of FIG. 1.
Figure 5:
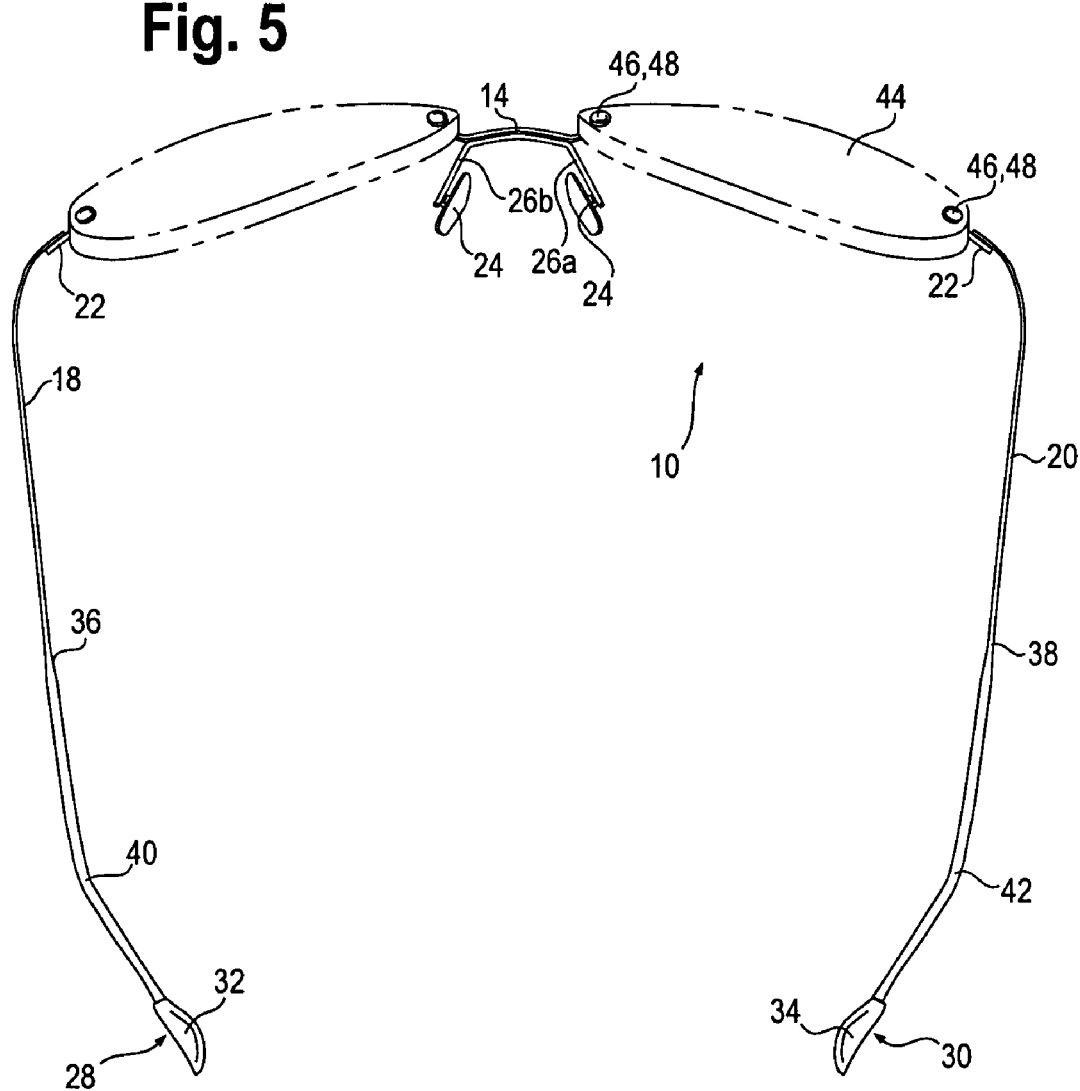
FIG. 5 is a bottom view of the hingeless eyeglass frame of FIG. 1.
Figure 6:
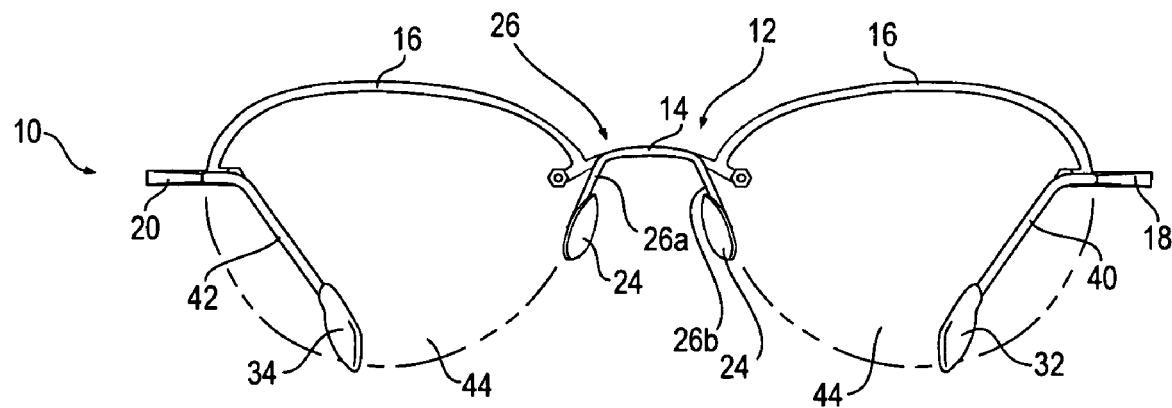
FIG. 6 is a back elevational view of the hingeless eyeglass frame of FIG. 1.

Referring to FIGS. 1–6, the present invention is directed to a hingeless eyeglasses frame 10. The eyeglasses frame 10 includes a body 12 having a central bridge portion 14 and lens attachment segments 16 disposed opposite the bridge portion. First and second temple sections 18, 20 extend rearwardly from each corresponding end 22 of the lens attachment segments. The ends 22 of the lens attachment portion may also be referred to as attachment tabs. The temple sections 18, 20 are preferably soldered or welded to the ends 22 of the lens attachment segments 16 to form a hingeless connection, creating a functionally one-piece frame. Note that any connection method may be used that creates an electrically conductive metal-to-metal bond, including soldering, brazing, spot welding and the like.

As shown in greater detail in FIG. 2A, one of the temple sections 18 is shown attached to the attachment tab 22. Soldering or welding the temple sections 18, 20 to the ends or attachment tab 22 of the lens attachment segments 16 provides increased structural integrity, and results in a frame that is stronger than true one-piece frames, which are subject to breakage or distortion, as discussed hereinafter. True one-piece unitary hingeless frames are formed from a single continuous piece of metal, from tip of ear stem to tip of ear stem. The subject invention differs, in part, because the temple sections 18, 20 are separate from the body 12, and are attached during a separate manufacturing step. Note, however, that the lens attachment sections 16 are integrally formed with the bridge portion 14 to provide the body 12, which is a true one-piece unitary component.

In known true one-piece unitary hingeless frames, metal fatigue problems occur at the point where the ear stem meets the attachment portion near the lens due to the constant flexing. This results in an unacceptable level of breakage necessitating replacement of the frames and customer dissatisfaction with the product. Accordingly, in the present invention, the temple sections are separate from the lens attachment sections 16 and are attached thereto with welds, solder, brazing and the like. Formation of a separate joint between the two pieces of metal permits additional flexing by providing an increase in the bending radius near the overlap of the two components.

Another advantage of the present invention using a hingeless frame 10 with soldered or welded temple sections 18, 20 relates to manufacturing costs, complexity and structural integrity. In that regard, some known frames are truly a one piece frame, that is, a single piece of metal formed or stamped out that provides a continuous unitary piece of metal from temple tip to temple tip, with no assembly or attachment required (except possibly for nose pads). However, there are several disadvantages to frames manufactured in this way.

First, it is usually desirable to form a frame have components of differing gauge and cross-sectional shape. For example, the temple sections or ear stems are typically formed from material a having gauge and cross-sectional shape different from that of the front of the frame where the lens are attached. This is because the strength requirements, and flexibility requirements, not to mention aesthetic factors of these components may differ.

In that regard, in hingeless frames, the ear stems are usually thin and flexible, while the front of the frame is often thicker or wider for increased strength and stiffness. It is relatively expensive and technologically complex to manufacture a frame formed from a single continuous piece of metal that has portions of differing gauge and cross-sectional shape. Hingeless frames made in this way are necessarily more expensive and difficult to produce.

Alternatively, forming a hingeless unitary frame from one continuous piece of metal having a uniform gauge and cross-sectional shape may result in a fragile and/or economically undesirable frame. In that regard, if the entire frame, and in particular, the front portion of the frame, is made from a selected gauge of metal that is sufficiently strong or stiff to provide proper support for the lens, such a stiff gauge of metal may be unsuitable for forming the ear stems, which must be very flexible in a hingeless frame design. On the other hand, if the entire frame is made from a selected gauge of metal that is sufficiently resilient and flexible for use as the ear stems, then the front portion or lens attachment portion may not be sufficiently strong or stiff.

In one specific embodiment of the present invention, the frame 10 may also include nose pads 24 operatively coupled to the bridge portion 14 (FIGS. 1–3, 5–7). As shown in greater detail in FIG. 3A, preferably, each nose pad 24 may be soldered or welded to a U-shaped connector 26 having legs 26a, 26c depending from a base portion 26c, which connects the two legs. The base portion 26c of the U-shaped connector 26 may be soldered or welded to the bridge portion 14 Specifically, the U-shaped connector 26 may be soldered or welded to the bridge 14 at several points along the base 26c (via spot welding) or may be attached using a continuous weld. Because each nose pads 24 are made of metal, they may also be soldered or welded directly to the bridge portion 14 without use of the leg 26 (not shown).

Distal ends 28, 30 of each temple section 18, 20 include a tip 32, 34, which may be formed in a bulbous, oblong or teardrop shape. The tips 32, 34 may also be spherical, however any enlarged shape may be used. Each tip is preferable made of metal and is also welded or soldered to the respective temple section 18, 20 to create a continuous electrical pathway along the entire frame 10. Thus, the entire frame 10 is electrically conductive from the first temple tip, through the body 12, to the second temple tip, with no non-metallic components separating the components.

In one specific embodiment, a portion of the temple sections 18, 20, may be coated with a thin covering 40, 42 for user comfort. Preferably, the covering 40, 42 is made of plastic, acrylic, polyurethane, or another similar material to protect the metal from corrosion caused by perspiration. The coating may extend from the distal ends 28, 30 of the temple sections, but do not cover any portion of the tips 32, 34, to an approximate midpoint 36, 38 of the temple sections.

The frame 10 is constructed entirely of metal, unlike known hingeless frames that generally contain at least some plastic or other non-conducting components. Although the optional plastic coating is certainly non-conducting, it does not form a structural part of the frame. Preferably, the frame 10 is made of stainless steel, aluminum, titanium, nickel silver, copper, brass, or alloys thereof. Because the body 12, lens attachment segments 16, temple sections 18, 20, nose pads 24, and temple section tips 32, 24 all are formed of metal, the frame 10 provides an uninterrupted electrical conductor. Such an all-metal construction ensures its sturdiness, but remains sufficiently lightweight to wear comfortably. The all-metal frame 10 also resists wear.

In one specific embodiment, lenses 44 are operatively coupled to the lens attachment segments of the frame 10, to form eyeglasses or sunglasses. Both the lenses 44 and the lens attachment segments 16 may include apertures 46 for receiving fasteners 48. Suitable fasteners may include, but are not limited to, screws, bolts, pins and the like, as is known. The lenses 44 may be made of plastic, glass, or other similar known materials.

Figure 7:
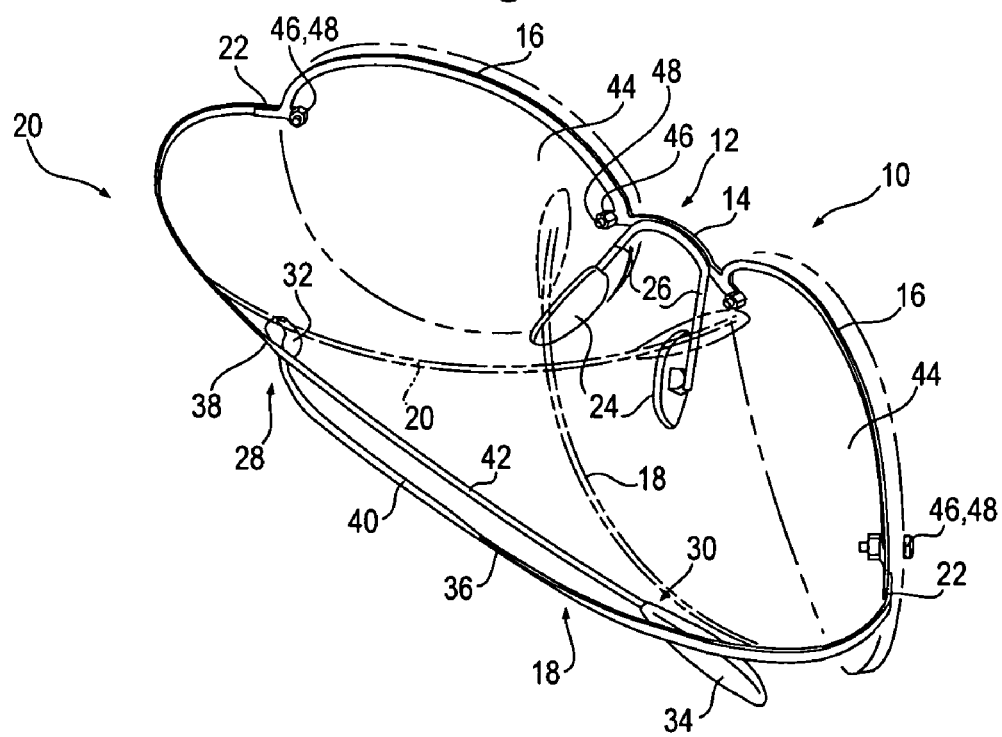
FIG. 7 is a perspective view of the hingeless eyeglass frame of the present invention, depicting the frame in a closed, or folded state.

FIGS. 1–6 illustrate eyeglasses constructed according to the present invention in an open state, ready to be worn. FIG. 7 shows the eyeglasses in a closed, or folded state, for storage and/or shipment. Because the frame 10 is hingeless, the temple sections 18, 20 are very flexible, and are capable of folding compactly for economical shipping and aesthetically pleasing display in a retail establishment. The temple sections 18, 20 are sufficiently flexible and resilient to permit them to be bend or folded over each other, and may bend by more than 180 degrees, and possibly as much or greater than 270 degrees so that the temple sections fold back and may cross over each other between the nose pads 24, as shown in phantom lines in FIG. 7. The reinforcement provided by the soldered or welded ends 22 further protects the frame 10 from snapping or distorting during shipment and storage.

While the invention has been described in connection with certain embodiments, it should be understood that it is not intended to limit the invention to these particular embodiments. To the contrary, it is intended to cover all alternatives, modifications, and equivalents falling within the spirit and scope of the invention.

What is claimed is:

1. A frame for a pair of eyeglasses, comprising:
   an all-metal body having a central bridge portion;
   nose pads operatively coupled to the bridge portion;
   lens attachment segments disposed opposite the bridge portion, each lens attachment segment having an attachment tab;
   left and right temple sections extending rearwardly from each corresponding attachment tab, the temple sections being soldered or welded to the attachment tab; and
   distal ends of the temple sections each terminating in a metallic tip formed in a bulbous, oblong, teardrop or spherical shape, wherein the body, bridge portion, nose pads, attachment segments, temple sections and metallic tip form an uninterrupted electrically conductor.

2. The frame of claim 1, wherein the temple sections are flexible and are adapted to resiliently fold inwardly and cross over each other at a location between the nose pads.

3. The frame of claim 1, wherein the frame is formed as a one-piece structure.

4. The frame of claim 1, wherein the temple sections are operatively coupled to the lens attachment segments by a hingeless connection.

5. The frame of claim 1, wherein the temple sections are operatively coupled to the lens attachment segments by means that facilitates continuous electrical conductivity between the lens attachment segments and the temple sections.

6. The frame of claim 1, wherein the temple sections are formed of a different gauge metal than the lens attachment segments.

7. The frame of claim 1, wherein the nose pads are soldered or welded to the bridge portion.

8. The frame of claim 1, further including a U-shaped connector having a base and legs depending from the base, the base being soldered or welded to the bridge portion and a nose pad soldered or welded to distal ends of each leg.

9. The frame of claim 1, wherein at least a portion of each temple section between the attachment tab and the tip is coated with an insulating material selected from the group consisting of plastic, acrylic, and polyurethane.

10. The frame of claim 1, wherein the body is made of material selected from the group consisting of stainless steel, aluminum, titanium, nickel silver, copper, brass, and alloys thereof.

11. The frame of claim 1, wherein each metallic component coupled to the body is welded or soldered to facilitate electrical conductivity along each component.

12. The frame of claim 1, wherein each temple section is sufficiently resilient and flexible so as to accommodate a bend of over 180 degrees without crimping.

13. The frame of claim 1, wherein the body, lens attachment segments, temple sections, nose pads, and temple section tips all are formed of metal selected from the group consisting of stainless steel, aluminum, titanium, nickel silver, copper, brass, and alloys thereof.

14. A frame for a pair of eyeglasses, comprising:
   an all-metal body having a central bridge portion;
   nose pads operatively coupled to the bridge portion;
   lens attachment segments disposed opposite the bridge portion, each lens attachment segment having an attachment tab;
   left and right temple sections extending rearwardly from each corresponding attachment tab, the temple sections being soldered or welded to the attachment tab to form an electrically conductive hingeless connection; and
   distal ends of the temple sections each terminating in a metallic tip formed in a bulbous, oblong, teardrop or spherical shape, wherein the body, bridge portion, nose pads, attachment segments, temple sections and metallic tip form an uninterrupted electrically conductor.

15. The frame of claim 14, wherein the nose pads are soldered or welded to the bridge portion.

16. The frame of claim 14, wherein the temple sections are flexible and are adapted to resiliently fold inwardly and cross over each other at a location between the nose pads.

17. The frame of claim 14, wherein each temple section is sufficiently resilient and flexible so as to accommodate a bend of over 180 degrees without crimping.

18. The frame of claim 14, wherein at least a portion of the temple sections between the attachment tab and the tip are coated with a thin covering of a material selected from the group consisting of plastic, acrylic, and polyurethane.

19. The frame of claim 14, wherein the frame is made of material selected from the group consisting of stainless steel, aluminum, titanium, nickel silver, copper, brass, and alloys thereof.

20. A pair of eyeglasses, comprising:
   an all-metal body having a central bridge portion, lens attachment segments disposed opposite the bridge portion, and first and second temple sections extending rearwardly from ends of the lens attachment segments, wherein the temple sections are soldered or welded to the ends of the lens attachment segments;
   nose pads operatively coupled to the bridge portion;
   distal ends of the temple sections, each having a metal tip formed in a bulbous, oblong, teardrop or spherical shape; and
   a lens operatively coupled to each lens attachment segment, wherein the body, bridge portion, nose pads, attachment segments, temple sections and metallic tip form an uninterrupted electrically conductor.

21. The eyeglasses of claim 20, wherein the lenses and the lens attachment segments include apertures for receiving fasteners.

22. The eyeglasses of claim 20, wherein the nose pads are soldered to the bridge.

23. The frame of claim 20 further including a U-shaped connector having a base and legs depending from the base, the base being soldered or welded to the bridge portion and a nose pad soldered or welded to distal ends of each leg portion.

24. The eyeglasses of claim 20, wherein the temple sections are coated with a plastic coating from the distal tips to a mid-point of the temple section.

25. The eyeglasses of claim 20, wherein the body, nose pads, temple section, and temple section tips are made of material selected from the group consisting of stainless steel, aluminum, titanium, nickel silver, copper, brass, and alloys thereof.

26. The frame of claim 20, wherein each temple section is sufficiently resilient and flexible so as to accommodate a bend of over 180 degrees without crimping.

* * * * *